(12) United States Patent
Martinez

(10) Patent No.: US 8,720,596 B1
(45) Date of Patent: May 13, 2014

(54) DEVICE FOR LEVELING PLAYING FIELDS

(71) Applicant: Amador Martinez, Oxnard, CA (US)

(72) Inventor: Amador Martinez, Oxnard, CA (US)

(*) Notice: Subject to any disclaimer, the term of this patent is extended or adjusted under 35 U.S.C. 154(b) by 47 days.

(21) Appl. No.: 13/649,110

(22) Filed: Oct. 11, 2012

Related U.S. Application Data

(60) Provisional application No. 61/642,458, filed on May 4, 2012.

(51) Int. Cl.
*A01B 33/00* (2006.01)

(52) U.S. Cl.
USPC .......................................................... 172/63

(58) Field of Classification Search
CPC ..... A01D 34/86; A01D 34/661; A01D 75/36; A01D 75/306; E02F 3/64; E02F 3/6454; E02F 3/658; E02F 3/7631; E02F 3/7663; E02F 3/8155
USPC ............. 56/6, 15.5, 228; 172/40, 42, 70, 197, 172/326, 413, 421, 460, 611, 799.5, 684.5, 172/445.1, 63–69, 71–73
See application file for complete search history.

(56) References Cited

U.S. PATENT DOCUMENTS

| | | | | |
|---|---|---|---|---|
| 4,040,761 A * | 8/1977 | Rahn | ............................... | 180/198 |
| 4,066,131 A * | 1/1978 | Zandbergen | ................... | 172/680 |
| 4,304,307 A * | 12/1981 | Anderson | ...................... | 172/791 |
| 4,815,259 A * | 3/1989 | Scott | .................................... | 56/6 |
| 4,949,534 A * | 8/1990 | Evans | ................................. | 56/6 |
| 5,224,552 A * | 7/1993 | Lee et al. | .......................... | 172/52 |
| 5,226,283 A * | 7/1993 | Hughes, Jr. | .......................... | 56/6 |
| 5,600,943 A * | 2/1997 | Ryan | ............................... | 56/13.6 |
| 6,519,880 B2 * | 2/2003 | Robitaille | ........................ | 37/231 |

\* cited by examiner

*Primary Examiner* — Robert Pezzuto

(57) ABSTRACT

A device for leveling playing fields is useful for ensuring that bowling greens are flattened within established parameters. The device for leveling playing fields comprises a main frame mechanically coupled to a front skid and a rear skid and a blade assembly where the blade assembly further comprises cutting blades driven by a blade drive chain mechanically coupled to an engine. The main frame is further mechanically coupled to a lawn tractor such that a user can drive the lawn tractor over a playing field and use the front skid to knock the turf in hills loose, the cutting blades both manicure the playing field and cut loose turf which can be pushed by the rear skid into valleys.

3 Claims, 4 Drawing Sheets

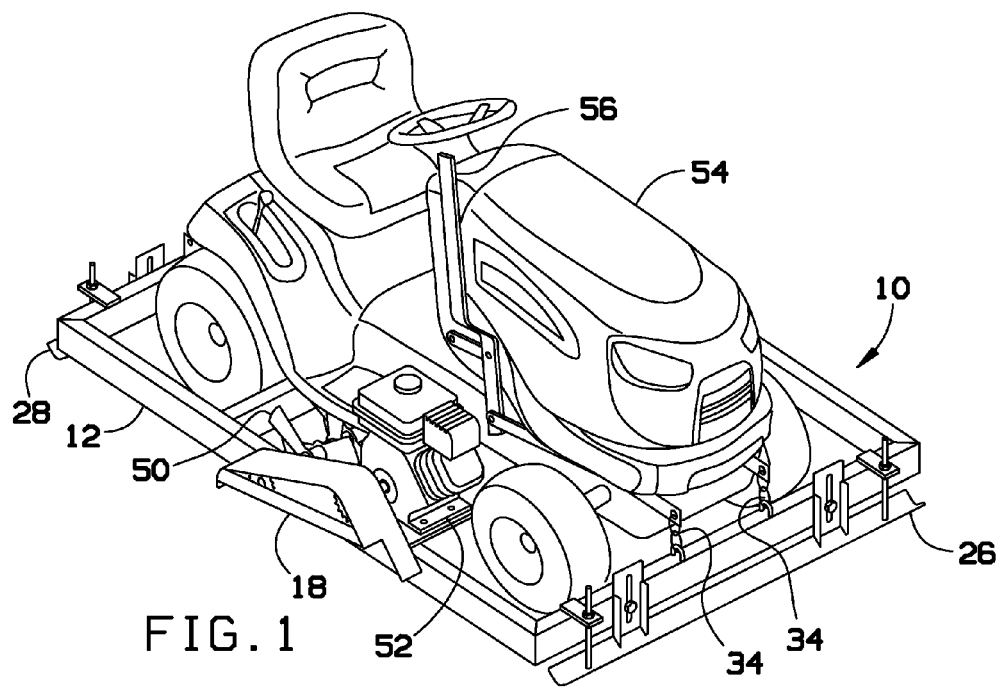
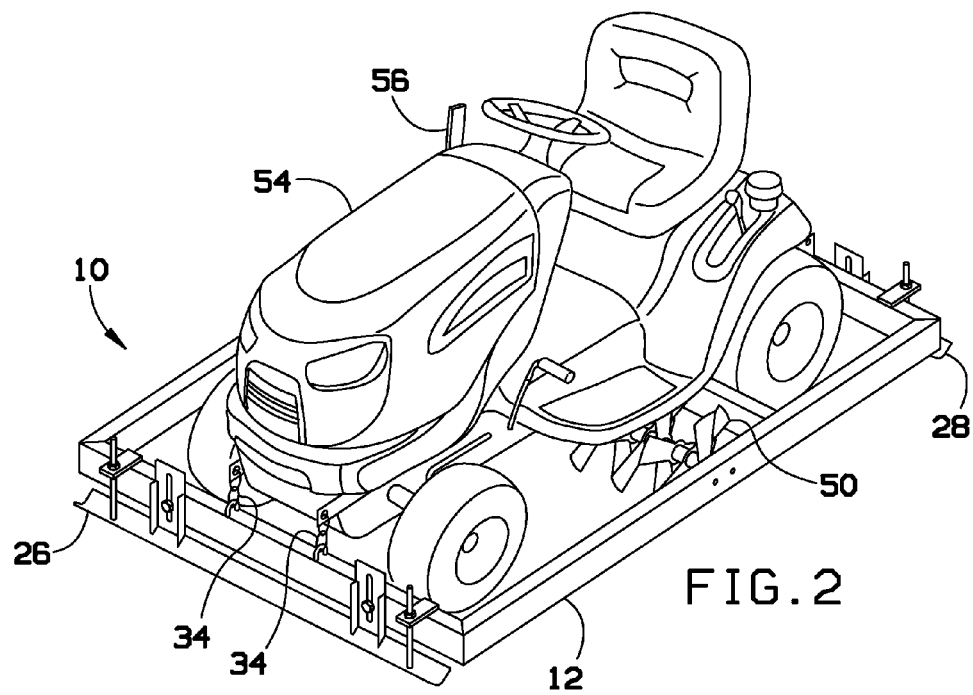

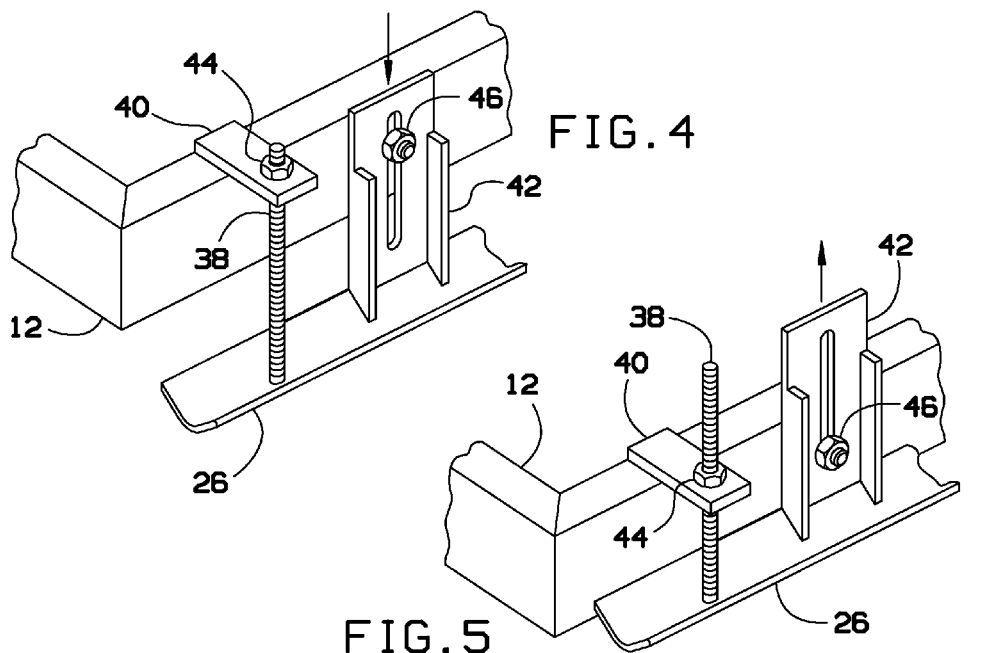
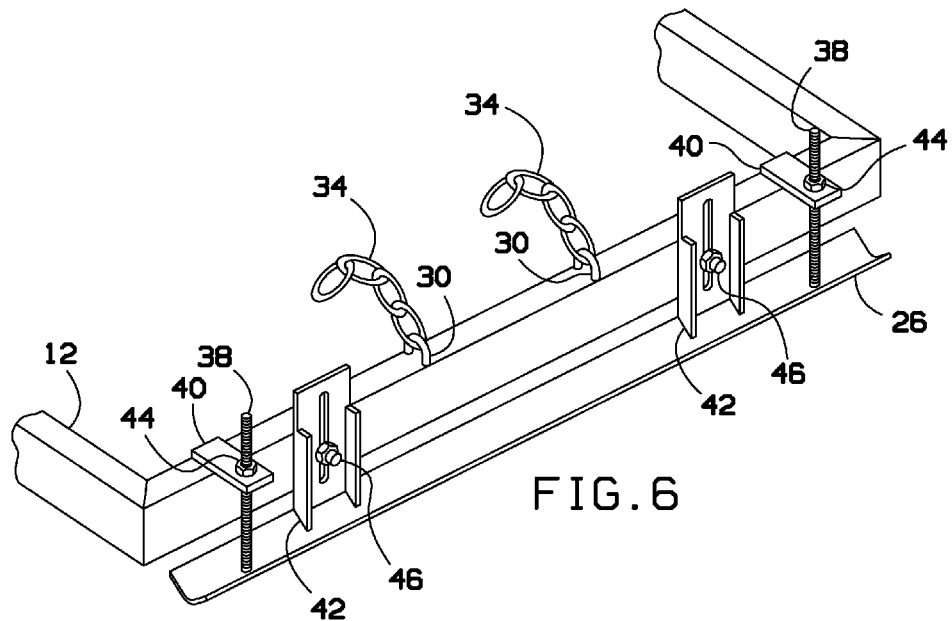

DEVICE FOR LEVELING PLAYING FIELDS

CROSS REFERENCE TO RELATED APPLICATIONS

This application claims priority to U.S. Provisional Application 61/642,458 filed on May 4, 2012.

FIELD OF THE INVENTION

This invention relates to devices for working the earth. In particular, this invention relates to devices that level lawn bowls fields.

BACKGROUND OF THE INVENTION

Bowls (also lawn bowls, variants include flat-green bowls and crown-green bowls) is a sport in which the objective is to roll biased balls so that they stop close to a smaller ball called a "jack" or "kitty". It is played on a pitch which may be flat (for "flat-green bowls") or convex or uneven (for "crown-green bowls"). It is normally played outdoors although there are some indoor venues and the surface is either natural grass, artificial turf, or cotula.

Lawn bowls is usually played on a large, rectangular, precisely leveled and manicured grass or synthetic surface known as a bowling green which is divided into parallel playing strips called rinks. In the United States, the bowling green is typically 120 feet by 120 feet. In the simplest competition, singles, one of the two opponents flips a coin to see who wins the "mat" and begins a segment of the competition (in bowling parlance, an "end"), by placing the mat and rolling the jack to the other end of the green to serve as a target. Once it has come to rest, the jack is aligned to the center of the rink and the players take turns to roll their bowls from the mat towards the jack and thereby build up the "head".

The present invention is concerned with maintaining precisely leveled and manicured grass. Prior to the disclosed invention, bowling greens were made in the following manner: the pitch had all vegetation removed and a washed sand base was inserted. The washed sand base was leveled using a number 55 sieve to level the bowling green. Then, the user installs the turf. Under current lawn bowls regulations, the precisely leveled field cannot have a variance on the 120 foot bowling green of no more than ⅛ inch. This obviously takes some time to calibrate.

After the field is calibrated it is maintained with a grooming wheel in a manner similar to golf courses. However, golf courses do not require a variance on the 120 foot bowling green of no more than ⅛ inch, so, over time, the variance increases as a result of foot traffic, natural movement of the earth and so on creating "hills" which are upward deformities and "valleys" which are downward deformities. Prior to the disclosed invention the only way to correct variations in the bowling green was to remove the turf, level the washed sand base and basically start all over again. The present invention solves this problem.

BRIEF SUMMARY OF THE INVENTION

A device for leveling playing fields is useful for ensuring that bowling greens are flattened within established parameters. The device for leveling playing fields comprises a main frame mechanically coupled to a front skid and a rear skid and a blade assembly where the blade assembly further comprises cutting blades driven by a blade drive chain mechanically coupled to an engine. The main frame is further mechanically coupled to a lawn tractor such that a user can drive the lawn tractor over a playing field and use the front skid to knock the turf in hills loose, the cutting blades both manicure the playing field and cut loose turf which can be pushed by the rear skid into valleys.

The main frame is mechanically coupled to the front skid and the rear skid with skid height adjustment welded nuts which decreases the length of a skid height adjustment threaded rod between skid height adjustment tabs mechanically coupled to the main frame and the front skid or rear skid. This allows for careful calibration of the front skid and rear skid to ensure that playing fields are sufficiently level to comply with lawn bowls regulations.

The main frame is mechanically coupled to front chain mounting loops, which are further mechanically coupled to tractor mounting chains. The tractor mounting chains can be used to mechanically couple the device for leveling playing fields to the tractor. In this manner, the device for leveling playing fields can be an attached as an aftermarket accessory to the tractor.

BRIEF DESCRIPTION OF THE SEVERAL VIEWS OF THE DRAWINGS

Figure 3:
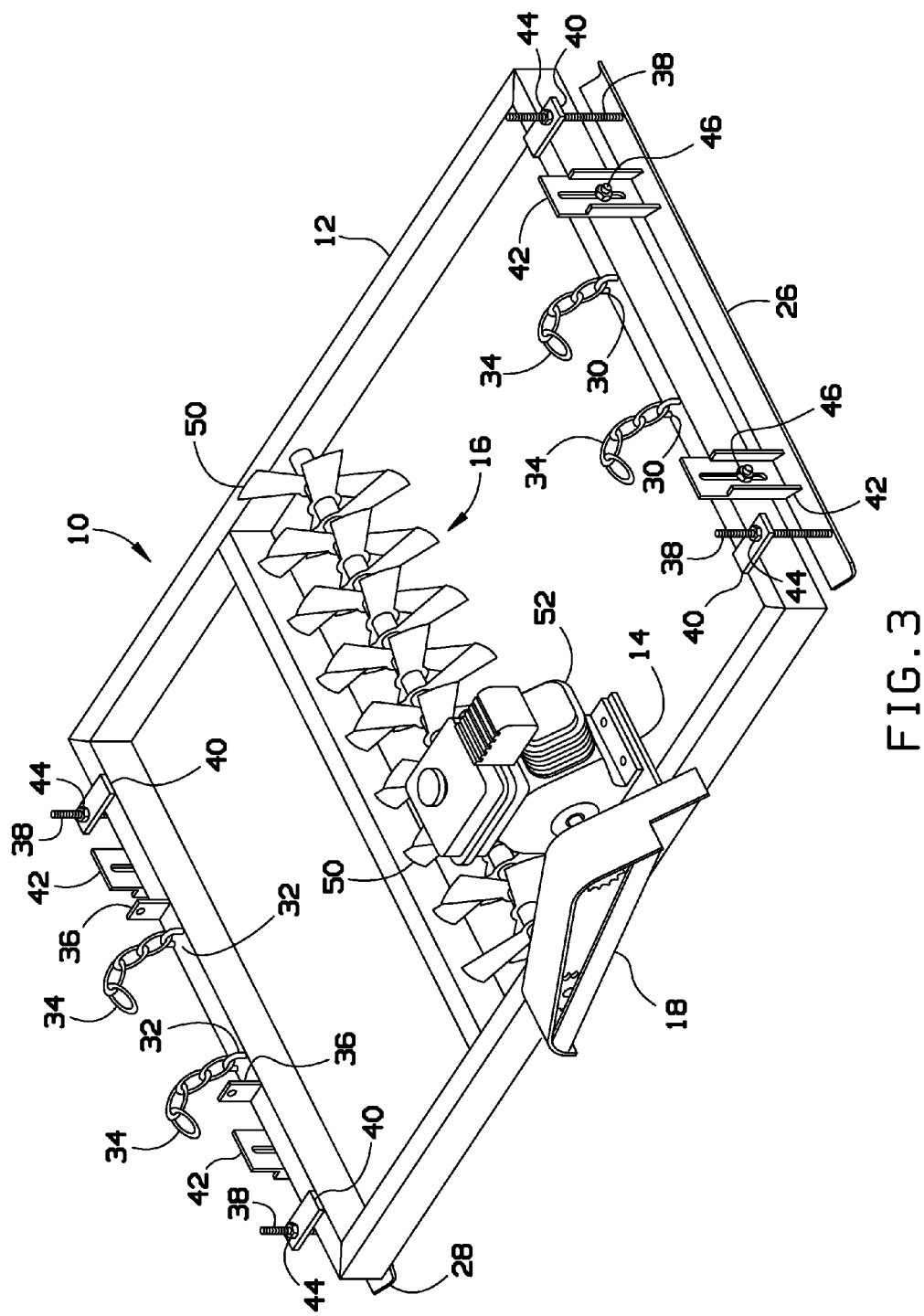
Figure 7:
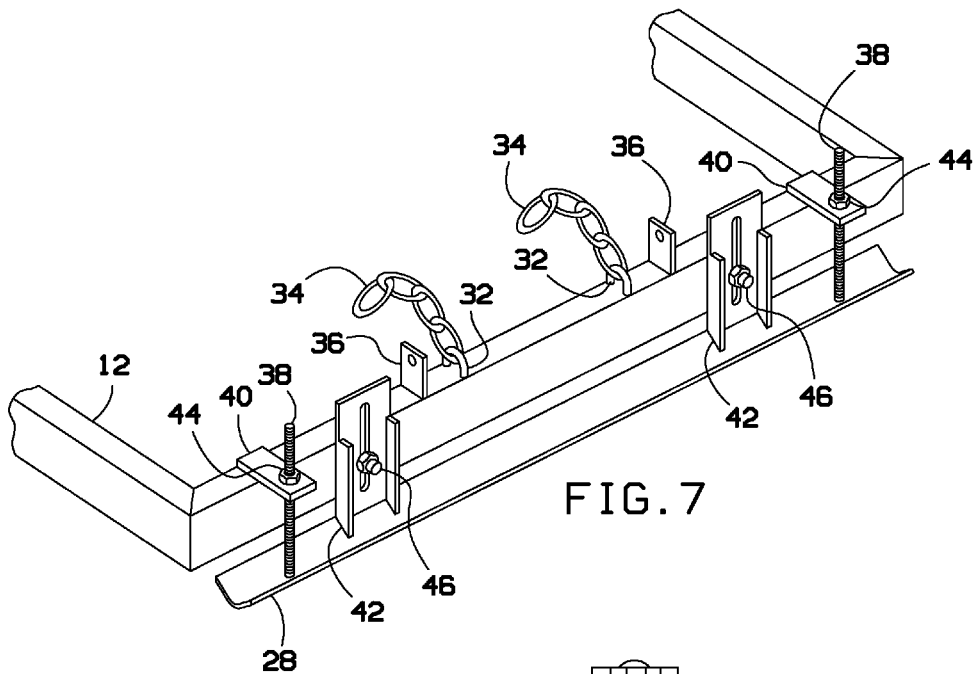
Figure 8:
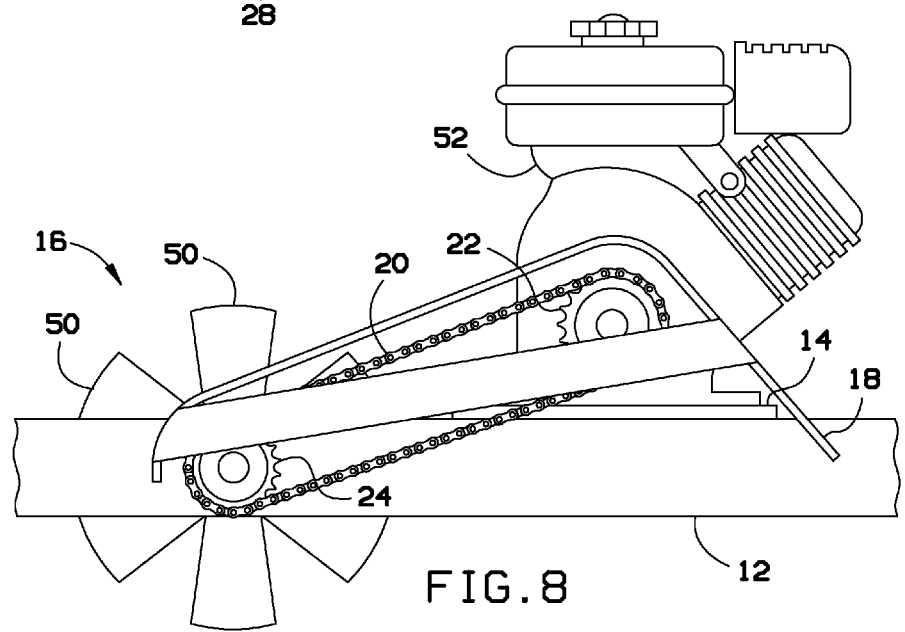

Having thus described the invention in general terms, reference will now be made to the accompanying drawings, which are not necessarily drawn to scale, and wherein:

FIG. 1 is a perspective view of the invention shown in use.
FIG. 2 is a perspective view of the invention shown in use.
FIG. 3 is a perspective view of the invention.
FIG. 4 is a detailed perspective view of the front skid shown in the lowered position.
FIG. 5 is a detailed perspective view of the front skid shown in the raised position.
FIG. 6 is a detailed front perspective view of the invention.
FIG. 7 is a detailed rear perspective view of the invention.
FIG. 8 is a detailed right side view of the invention showing the engine and the blade assembly.

DETAILED DESCRIPTION OF THE INVENTION

Embodiments of the present invention overcome many of the obstacles associated with leveling bowling greens, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 and FIG. 2 show perspective views of the invention in use. Device for leveling playing fields comprises lawn tractor 54 which is mechanically coupled to main frame lift handle 56. Main frame lift handle 56 is mechanically coupled to tractor mounting chain 34 which is further mechanically coupled to main frame 12. Main frame 12 comprises front skid 26, rear skid 28 and drive chain guard 18. Device for leveling playing fields further comprises engine 52, which is mechanically coupled to cutting blades 50 by blade drive chain 20 (not shown) as shown in more detail in FIG. 3.

FIG. 3 shows a perspective view of device for leveling playing fields. Main frame 12 is mechanically coupled skid height adjustment tabs 40 and skid height adjustment brackets 42. Skid height adjustment tabs 40 are mechanically coupled to front skid 26 by skid height adjustment threaded rod 38. The distance between front skid 26 and main frame 12 can be adjusted by skid height adjustment welded nuts 44 and skid height adjustment nuts 46. Similarly, skid height adjustment tabs 40 are mechanically coupled to rear skid 28 by skid height adjustment threaded rod 38. The distance between rear skid 28 and main frame 12 can be adjusted by skid height adjustment welded nuts 44 and skid height adjustment nuts 46.

On the front of main frame 12, main frame 12 is mechanically coupled to front chain mounting loops 30, which are further mechanically coupled to tractor mounting chains 34. Main frame 12 is additionally mechanically coupled to rear chain mounting loops 32, which are further mechanically coupled to tractor mounting chains 34. Tractor mounting chains 34 can be used to mechanically couple device for leveling playing fields 10 to lawn tractor 54 as shown in FIG. 1 and FIG. 2. Main frame 12 can be further mechanically coupled to lawn tractor 54 by rear tractor mounting brackets 36 as shown in FIG. 7. Blade assembly 16 comprises cutting blades 50 which are mechanically coupled to engine 52 as shown in more detail in FIG. 8. Engine 52 is mechanically coupled to main frame 12 by engine mounting plate 14.

FIG. 4 shows the connection between mainframe 12 and front skid 26 in more detail. To lower front skid 26 a user turns skid height adjustment welded nuts 44, which increases the length of skid height adjustment threaded rod 38 between skid height adjustment tabs 40 and front skid 26. Similarly, skid height adjustment nuts 26 should be loosened while adjusting height and tightened once the height has reached a user preference. Front skid 26 and rear skid 28 can be made of any material, but in the preferred embodiment they are made of metal and are carefully calibrated with height adjustment nuts 46 to ensure front skid 26 and rear skid 28 are level to each other.

FIG. 5 shows the connection between mainframe 12 and front skid 26 in more detail. To raise front skid 26 a user turns skid height adjustment welded nuts 44 which decreases the length of skid height adjustment threaded rod 38 between skid height adjustment tabs 40 and front skid 26. Similarly, skid height adjustment nuts 26 should be loosened while adjusting height and tightened once height reaches a user preference.

FIG. 6 shows the connection between mainframe 12 and front skid 26 in a perspective view. Techniques for increasing the distance or decreasing the distance between main frame 12 and front skid 26 are shown in FIG. 4 and FIG. 5.

FIG. 7 shows the connection between mainframe 12 and rear skid 28 in more detail. The distance between rear skid 28 and mainframe 12 can be adjusted in the same manner as front skid 26. Main frame 12 is mechanically coupled to rear tractor mounting brackets 36 and rear chain mounting loops 32, as noted above. Rear chain mounting loops 32 are mechanically coupled to tractor mounting chains 34.

FIG. 8 shows blade assembly 16 in more detail. Engine 52 is mechanically coupled to first sprocket 22, which is further mechanically coupled to blade drive chain 20. Blade drive chain 20 is mechanically coupled to lower sprocket 24. Lower sprocket 24 is mechanically coupled to a shaft, which is further mechanically coupled to cutting blades 50. As noted above mainframe 12 is mechanically coupled to in engine mounting plate 14 and drive chain guard 18.

The device for leveling playing fields works in the following manner, a user engages the device starting the cutting blades and drives over the bowling green in a series of columns. As the user drives over an imperfection in the bowling green, such as a slight hill, then front skid 26 knocks the turf loose, the turf is then cut and loosened with cutting blades 50 and can be pushed into a slight valley with rear skid 28.

Another advantage of the present invention is that it can be attached as an aftermarket accessory to virtually any lawn tractor. It can also be sold as a single device with a lawn tractor.

That which is claimed:

1. A device for leveling playing fields is useful for ensuring that bowling greens are flattened within established parameters, the device for leveling playing fields comprising, a main frame mechanically coupled to a front skid and a rear skid and a blade assembly where the blade assembly further comprises cutting blades attached to a shaft that is driven by a blade drive chain mechanically coupled to an engine; wherein the cutting blades further comprise a plurality of blades extending from the shaft wherein each blade is rotationally offset from the plurality of blades proximate to that blade along the shaft;

the main frame is further mechanically coupled to a lawn tractor wherein all distal points of the lawn tractor are surrounded by the main frame and configured such that a user can drive the lawn tractor over a playing field and use the front skid to knock turf in hills loose, the cutting blades both manicure the playing field and cut loose the turf which can be pushed by the rear skid into valleys.

2. The device for leveling playing fields of claim 1, the main frame is mechanically coupled to the front skid and the rear skid with skid height adjustment welded nuts which can change a length of a skid height adjustment threaded rod between skid height adjustment tabs mechanically coupled to the main frame and the front skid or the rear skid, this allows for careful calibration of the front skid and the rear skid to ensure that playing fields are sufficiently level to comply with lawn bowls regulations.

3. The device for leveling playing fields of claim 1, the main frame is mechanically coupled to front chain mounting loops, which are further mechanically coupled to tractor mounting chains; the tractor mounting chains can be used to mechanically couple the device for leveling playing fields to the lawn tractor; in this manner, the device for leveling playing fields can be an attached as an aftermarket accessory to the lawn tractor.

\* \* \* \* \*